(12) United States Patent
Baeten et al.

(10) Patent No.: US 6,519,205 B1
(45) Date of Patent: Feb. 11, 2003

(54) GROUND ROLL ATTENUATION METHOD

(75) Inventors: Guido Josef Maria Baeten, West Sussex (GB); Roland Marschall, Hannover (DE)

(73) Assignee: Schlumberger Technology Corporation, Houston, TX (US)

(*) Notice: Subject to any disclaimer, the term of this patent is extended or adjusted under 35 U.S.C. 154(b) by 0 days.

(21) Appl. No.: 09/646,201

(22) PCT Filed: Mar. 25, 1999

(86) PCT No.: PCT/GB99/00936
§ 371 (c)(1),
(2), (4) Date: Nov. 15, 2000

(87) PCT Pub. No.: WO99/50688
PCT Pub. Date: Oct. 7, 1999

(30) Foreign Application Priority Data

Mar. 30, 1998 (GB) .............................. 9806847

(51) Int. Cl.⁷ .................................. G01V 1/00
(52) U.S. Cl. ........................................ 367/45
(58) Field of Search ............................. 367/45, 46, 47

(56) References Cited

U.S. PATENT DOCUMENTS

| | | | |
|---|---|---|---|
| 1,959,004 A | * 5/1934 | Owen ........................... | 637/45 |
| 4,556,962 A | * 12/1985 | Widrow ........................ | 637/45 |
| 5,555,530 A | * 9/1986 | Meechan ...................... | 367/45 |
| 4,757,480 A | * 7/1988 | Gutowski ...................... | 367/47 |
| 4,884,248 A | 11/1989 | Laster et al. .................. | 367/73 |
| 5,138,583 A | * 8/1992 | Wason et al. ................. | 367/38 |
| 5,781,503 A | * 7/1998 | Kim ............................. | 367/45 |

FOREIGN PATENT DOCUMENTS

| | | |
|---|---|---|
| EP | 0602703 A2 | 6/1994 |
| WO | WO98/22835 | 5/1998 |

OTHER PUBLICATIONS

PCT International Search Report dated Jul. 15, 1999 (PCT/GB 99/ 00936).
Rajni K. Verma, "Seismic Signal Processing Theory,"*Offshore Seismic Exploration*, XP–002108087 (excerpt only, from ISR).

* cited by examiner

*Primary Examiner*—Gregory J. Toatley, Jr.
(74) *Attorney, Agent, or Firm*—David S. Figatner; Williams, Morgan & Amerson, P.C.

(57) ABSTRACT

A method is disclosed for attenuating ground roll in seismic data signals. Seismic data signals are obtained from nearby seismic sensors. A difference filter is created that incorporates an estimate of ground roll differential move-out between the seismic sensors. The difference filter is then applied to the seismic data signals to produce a ground roll attenuated seismic data signal. The method can be used with one-pass and multiple-pass filter operations and can be used in connection with pairs of seismic data signals or with groups of seismic data signals from an areal pattern of nearby seismic sensors. The seismic data signals may be appropriately pre-processed and factors in addition to the ground roll differential move-out can be incorporated when creating the difference filter. The inventive method can be implemented in the time domain or in the frequency domain.

19 Claims, 2 Drawing Sheets

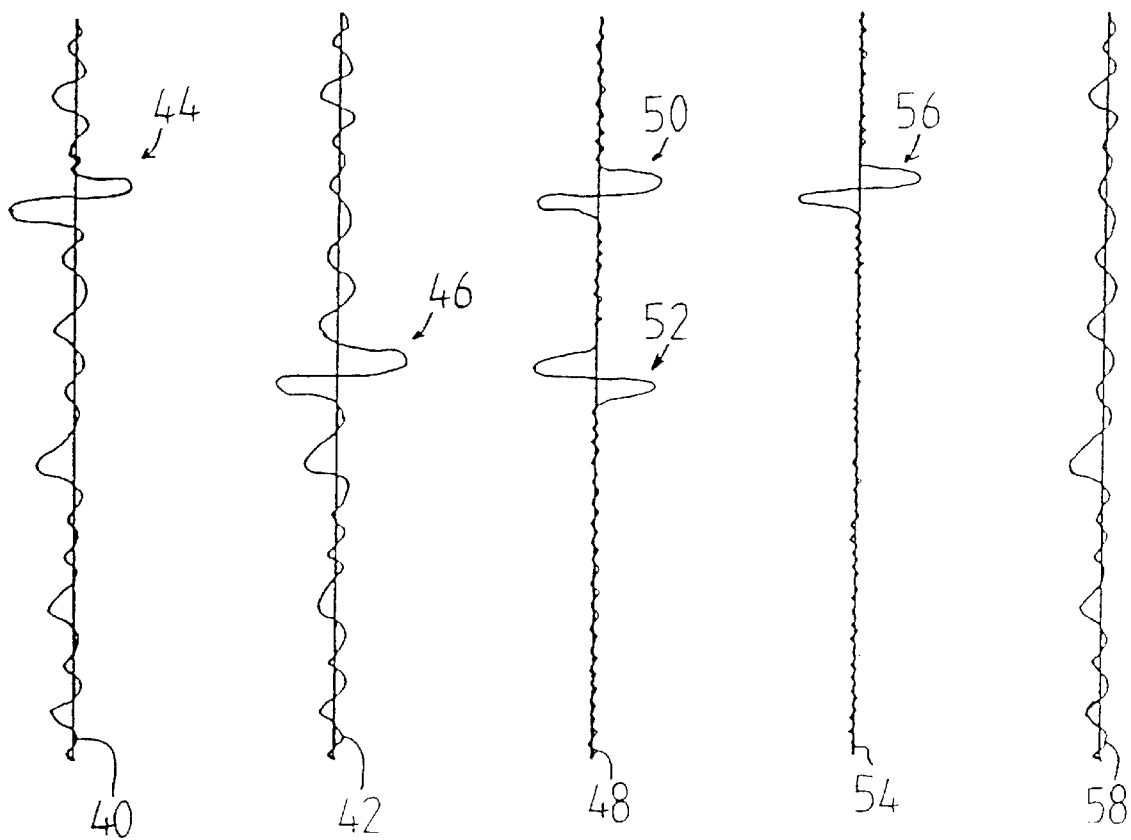

though the ground roll wave typically travels much slower than the velocity of
GROUND ROLL ATTENUATION METHOD

BACKGROUND OF THE INVENTION

1. Field of the Invention

The present invention relates to a method of attenuating ground roll in seismic data signals. The method can produce ground roll attenuated seismic data signals that provide a clearer view of the underlying geologic structure. The method is particularly suited for use with seismic data acquisition systems having small single-sensor receiver arrays where ground roll cannot be attenuated by stacking.

2. Description of the Related Art

Seismic data signals are collected to remotely sense subsurface conditions. particularly in connection with the exploration for and production of hydrocarbons such as oil and natural gas. To gather the seismic data, acoustic sources such as explosives, airguns, or vibrators are typically used to produce an acoustic signal that is transmitted through the geologic formations. Changes in acoustic impedance between different geologic layers cause a portion of the acoustic energy to be reflected and returned toward the earth's surface. These reflected signals are received by seismic sensors and are processed to create maps of the subsurface geology. A majority of seismic information regarding the subsurface is obtained using pressure wave data, where a pressure wave is produced by the acoustic source, reflected by interfaces between the earth's subsurface layers, and then received by seismic sensors located on or near the earth's surface.

A portion of the acoustic energy produced by the acoustic source is not, however, transmitted downward toward the subsurface formations, but instead travels horizontally along the earth's surface. This portion of the seismic signal, referred to as ground roll, travels at the Rayleigh wave velocity, which is typically much slower than the velocity of the pressure wave described above. Although the pressure wave typically travels much faster than the ground roll wave, the pressure wave must travel a much greater distance from the acoustic source to the reflecting layer to the seismic sensor than the ground roll wave that is transmitted along the surface of the earth from the source to the sensor, and it is not uncommon for a pressure wave and a ground roll wave to arrive at a seismic sensor simultaneously. Because the ground roll wave typically contains no information regarding subsurface geologic structure being investigated, it must be attenuated (i.e. removed) to the greatest extent possible before the seismic data is used to produce maps of the subsurface. Ground roll is generally considered a dominant noise source and effective removal of the ground roll signal often greatly enhances the quality of the subsurface image obtained during the seismic survey.

Ground roll does not travel with a unique propagation velocity, but instead displays a wide velocity range that depends on the seismic signal frequency. The dispersive character of the ground roll is one reason for the relatively long time duration of the ground roll signal. This dispersive character also makes it more difficult to develop methods of effectively attenuating ground roll in seismic data signals.

A conventional approach to the problem of ground roll suppression in seismic data processing is to use receiver arrays during data acquisition, and then to stack together the seismic data signals obtained from each of the receivers. The use of receiver arrays has some distinct disadvantages, however, both from a geophysical point of view and from an economic point of view. Currently, seismic data acquisition systems typically employ receiver arrays whose spatial extent is such that noise waves with wavelengths up to 1.4 times the sensor pattern length are attenuated. This leads to a spatial smearing effect: the response at a particular receiver station is the sum of all individual sensors in the receiver array. There is also a trend in the industry towards smaller bin sizes. The standard 50×50 meter bin sizes will likely be reduced, for example to 40×40 meters or 30×30 meters, to overcome spatial aliasing problems and to increase resolution. As an example, high resolution is required for reservoir monitoring to establish 3D-impedance maps of the reservoir. This concept of smaller bin sizes is compromised by the spatial smearing effect introduced by conventional receiver arrays.

Apart from the smearing effect, sensor patterns are also ineffective because they are too short. The stack array approach (effectively resembling a very long receiver array), which is effective in attenuating ground roll, requires full fold geometry, is too expensive, and is not often used. An overlay of patterns also counteracts high resolution. Another trend in high-resolution seismics is the use of multi-component recording, for example by using a pressure wave source and recording all mode-converted waves or by using a shear wave source and recording the shear wave response. However, for shear waves, the patterns have to be short (less than approximately 12 meters) to avoid signal attenuation due to shear statics. This further compromises the effectiveness of the patterns with regard to ground roll attenuation, and thus creates a signal to noise problem.

A single-sensor small-array seismic data acquisition system can avoid many of these difficulties. In this type of system, the seismic responses from each of the individual sensors can be individually processed (i.e. the seismic data signals from each of the seismic sensors in an array at a particular receiver station are not immediately stacked to attenuate the ground roll present in the seismic data signals).

Several benefits are associated with single-sensor small-array acquisition systems. Deep shot holes are not required to reduce the amount of ground roll generated: shallow shot holes are sufficient. Shallow holes are less expensive to drill and they provide environmental benefits by not requiring deeper ground water reservoir zones to be penetrated. Shot (acoustic source) patterns are not required, which reduces the cost and complexity of the seismic signal generation process. Extensive geophone patterns are not required, thereby reducing equipment weight and cost and reducing the number of field employees required to perform a seismic survey. Because the seismic data signals from individual sensors are acquired (instead of immediately stacking the response from an entire sensor array), optimum data processing steps such as shotgather-based depth migration or amplitude versus offset analysis are possible. Subsequent data processing also inherently acts a perfect random noise attenuator, i.e. random noise is canceled without any additional cost or required processing. It may also be possible to reduce the actual sensor coverage at a particular receiver station, from 24 to 16 for instance, due to the improved signal to noise ratio of the single sensor data.

If a single-sensor small-array system is to be effective, however, a new method of attenuating ground roll in the received seismic data signals must be utilized.

It is therefore an object of the present invention to provide an improved method of attenuating ground roll in seismic data signals.

SUMMARY OF THE INVENTION

According to the present invention there is provided a method of attenuating ground roll in seismic data signals, the method comprising the steps of obtaining seismic data signals from nearby seismic sensors, creating a difference filter that incorporates an estimate of ground roll differential move-out between the seismic sensors, and applying the difference filter to the seismic data signals to produce a ground roll attenuated seismic data signal.

The inventive method can be used with one-pass and multiple-pass filter operations and can be used in connection with pairs of seismic data signals or with groups of seismic data signals from an areal pattern of nearby seismic sensors. Alternative embodiments of the method involve appropriately pre-processing the seismic data signals obtained from the nearby seismic sensors or involve deriving additional factors when creating the appropriate difference filter. The inventive method can be implemented in the time domain or in the frequency domain.

BRIEF DESCRIPTION OF THE DRAWINGS

The present invention will now be described, by way of example, with reference to the accompanying drawings, in which:

FIG. 2 shows a suite of seismic data signals illustrating the inventive ground roll attenuation method.

DETAILED DESCRIPTION OF THE INVENTION

Figure 1:
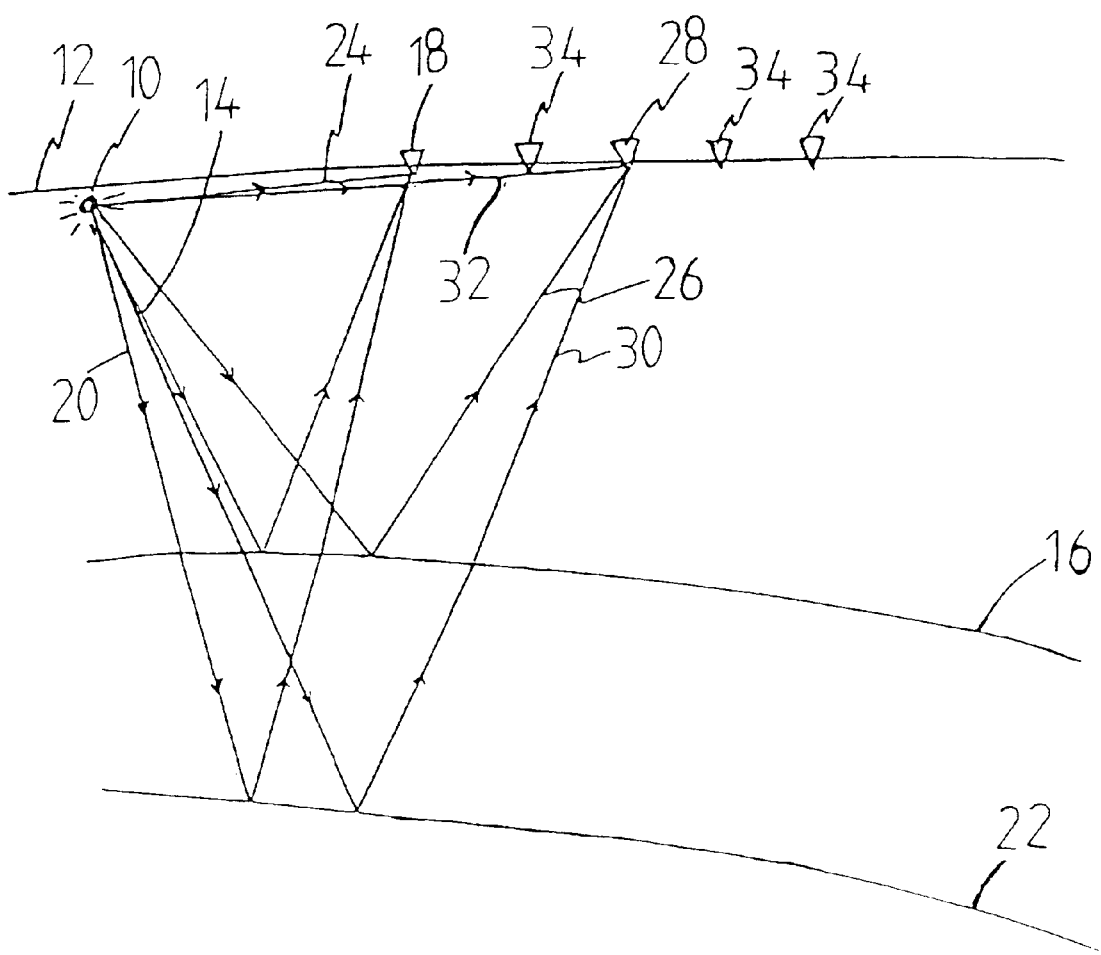
FIG. 1 shows a schematic view of the seismic data collection process.

FIG. 1 shows a simplified schematic view of the process of seismic data collection. An acoustic source 10, such as an explosive charge, is positioned below the earth's surface 12. When the acoustic source 10 is discharged, it produces an acoustic pulse that travels in all directions away from the source. Part of this acoustic pulse consists of a pressure wave 14 that travels from the acoustic source 10, is reflected by a seismic reflector 16, and is received by a seismic sensor 18. In FIG. 1, acoustic wavefronts, such as the pressure wave 14, are shown as raypaths for ease of illustration and seismic reflectors, such as the seismic reflector 16, comprise the interface between geologic layers having different acoustic impedances. Another part of the acoustic pulse consists of a pressure wave 20 that travels from the acoustic source 10, passes through the seismic reflector 16, is reflected by a seismic reflector 22, passes through the seismic reflector 16, and is received by the seismic sensor 18. A third part of the acoustic pulse consists of a ground roll wave 24 that travels near the earth's surface 12 from the acoustic source 10 to the seismic sensor 18.

In a similar manner, another part of the acoustic pulse consists of a pressure wave 26 that travels from the acoustic source 10, is reflected by the seismic reflector 16, and is received by a seismic sensor 28. A further part of the acoustic pulse consists of a pressure wave 30 that travels from the acoustic source 10, passes through the seismic reflector 16, is reflected by the seismic reflector 22, passes through the seismic reflector 16, and is received by the seismic sensor 28. An additional part of the acoustic pulse consists of a ground roll wave 32 that travels near the earth's surface 12 from the acoustic source 10 to the seismic sensor 28. The seismic sensors 18 and 28, along with additional seismic sensors 34, will typically form an array of seismic sensors that are spaced in an areal pattern at a particular receiver station.

It should be noted that for ease of illustration purposes the relative positions of the acoustic source 10, the seismic sensors, 18, 28, and 34, and the seismic reflectors 16 and 22 have been distorted. The spacing between the seismic sensors 18, 28, and 34 in a particular receiver array will typically be on the order of a few meters, and the distance between the acoustic source 10 and the farthest away seismic sensor may be on the order of one to two kilometers. The depth of the seismic reflectors of interest for hydrocarbon exploration however, may be on the order of between two and eight kilometers.

FIG. 2 shows a suite of seismic data signals, also called seismic traces, that will be used to describe the inventive ground roll attenuation method.

The inventive method for attenuating ground roll is based on the observation that, for seismic data signals received by nearby seismic sensors, the seismic reflection data will be nearly identical, whereas the ground roll component will have some differential move-out. This property can be employed to estimate the ground roll content, and subsequently to attenuate the ground roll.

In FIG. 2, a first seismic data signal 40 represents a characteristic seismic data signal obtained from the seismic sensor 18 in FIG. 1 and a second seismic data signal 42 represents a characteristic seismic data signal obtained from the seismic sensor 28 in FIG. 1. In the depictions of seismic data signals in FIG. 2, pressure wave amplitudes are displayed in conventional fashion as distances away from the central axis and the sampling interval (time or distance) is shown increasing toward the bottom of each of the seismic data signals. The first seismic data signal 40 will also be labeled later as $R_1$ and the second seismic data signal 42 will be labeled later as $R_2$.

It can be seen that first seismic data signal 40 and second seismic data signal 42 are virtually identical (because the sensors are located extremely close to each other compared to the distance the pressure waves must travel to reach the sensors), with the exception of a first ground roll influenced area 44 in the first seismic data signal and a second ground roll influenced area 46 in the second seismic data signal. Due to the significantly slower travel velocity of the ground roll wave; ground roll wave 32 reaches seismic sensor 28 significantly after ground roll wave 24 reaches seismic sensor 18. The second ground roll influenced area 46 is therefore later (i.e. lower down) in the second seismic data signal 42 than the first ground roll influenced area 44 in the first seismic data signal 40. This measurable difference in the arrival time of the ground roll wave, referred to as ground roll differential move-out, allows a differential filter to be created and applied to produce a ground roll attenuated seismic data signal.

In signal processing terms, with S representing the reflection signal and G representing the ground roll:

$R_1 = S_1 + G_1$ $R_2 = S_2 + G_2$

For small receiver spacing, however, the reflection signals for all of the nearby seismic sensors will be (nearly) identical, i.e. $S_1 = S_2 = S$. If we ignore the attenuation of the ground roll over the additional distance between seismic sensor 18 and seismic sensor 28, $G_2$ will be merely be signal $G_1$ with certain time delay. In the z-domain, a time delay of n samples can be represented by a multiplication with $z^n$. In the z-domain, therefore, $G_2 = Z^n G_1$.

To show how one embodiment of the difference filter operates, the second seismic data signal 42 is subtracted from the first seismic data signal 40. This subtraction produces an intermediate data signal 48 that shows the ground roll pulse received by seismic sensor 18 from raypath 24 in FIG. 1, first ground roll pulse 50, and shows an inverted version of the ground roll pulse received by seismic sensor 28 from raypath 32, second ground roll pulse 52 (as well as a certain amount of low-amplitude background noise).

In the terms defined above: $R_1-R_2=(S_1+G_1)-(S_2+G_2)$, but since $S_1=S_2$ and $G_2=Z^nG_1$, this can also be written as $R_1-R_2=(1-z^n)G_1$.

After an appropriate estimate of the ground roll differential move-out ($z^n$) has been established, the first ground roll pulse 50 and the second ground roll pulse 52 can be combined to produce a ground roll signal estimate 54 having an estimated ground roll pulse 56. The ground roll differential move-out term $z^n$ represents the time difference between where the ground roll appears in the first seismic data signal 40 and where the ground roll appears in the second seismic data signal 42.

In mathematical terms:

$$G_1 = \frac{R_1 - R_2}{1 - z^n}$$

The ground roll signal estimate 54 can then be subtracted from the first seismic data signal 40 to produce a ground roll attenuated seismic data signal 58. The acoustic signal caused by the ground roll wave 24 has been (substantially) removed from the first seismic data signal 40 and the ground roll attenuated seismic data signal 58 more accurately reflects the response from the pressure waves 14 and 20. In this way, the ground roll attenuated seismic data signal provides a better view of the underlying geologic structure between the acoustic source 10 and the seismic sensor 18.

In mathematical terms:

$$S_1 = R_1 - G_1$$

It should be noted that the seismic data signals shown in FIG. 2 have been simplified to more clearly demonstrate the inventive method of attenuating ground roll. In actual seismic data, the ground roll pulse will rarely be this distinct, both in terms of the duration of the pulse as well as its frequency content.

The filtering operation used to produce the ground roll signal estimate 54 ($G_1$) is only conditionally stable, however, because the denominator ($1-z^n$) can become zero. In practice, the ground roll estimate is typically stabilized by setting a factor $\delta$ which also partially accounts for the actual attenuation of the ground roll due to propagation losses as the ground roll wave travels over the additional distance between the seismic sensors. A stabilization constant on the order of 0.95 typically provides the most stable results.

The reflection signal and ground roll can be simultaneously calculated in a one-pass operation by solving the following linear equation:

$$\begin{bmatrix} S \\ G \end{bmatrix} = \frac{1}{1-\delta z^n} \begin{bmatrix} -z^n & 1 \\ 1 & -1 \end{bmatrix} \begin{bmatrix} R_1 \\ R_2 \end{bmatrix}$$

To properly implement the ground roll attenuation method, a (dominant) ground roll velocity needs to be known, since this determines the delay term $z^n$ appearing in the filter.

One method for determining a (dominant) ground roll velocity and corresponding delay factor $z^n$ utilizes seismic data signals received by three evenly spaced seismic sensors (Near, Middle, Far) positioned on a line colinear with the acoustic source. If $T_N$, $T_M$, and $T_F$ represent the seismic data signals received at seismic sensors N, M, and F, respectively, and $\Delta T_{FM}(z)=T_F(z)-T_M(z)$, and $\Delta T_{NM}(z)=T_N(z)-T_M(z)$, the delay term $z^n$ can be written in terms of correlation functions as follows:

$$z^n = \frac{\Delta T_{FM}(z)\Delta T_{NM}(1/z)}{\Delta T_{NM}(z)\Delta T_{NM}(1/z)}$$

The results represent a linear phase shift as a function of frequency, from which the delay can be derived. For a 3D (i.e. non-linear) geometry, the delay needs to be corrected to account for the actual difference in the radial separation between the acoustic source and the seismic sensors.

Other delay factor estimation methods can also be used. The delay could be "picked", for instance by measuring the distance between the cross-over points between the first ground roll pulse 50 and the second ground roll pulse 52 in intermediate data signal 48. A third method involves selecting a suite of possible time delays (based, for instance on the difference in distances from the receivers to the source and expected ground roll velocities) and then minimizing the energy of the signal estimate over various frequency-time-windows.

The method can also be enhanced by implementing steps intended to fulfill the assumptions of the difference technique more closely. Pre-processing steps can be implemented prior to creating the difference filter to allow the seismic data signals to more closely match the assumptions of the method. These pre-processing steps can include correcting the seismic data signals for normal move out (the relatively minor time shift in the received reflection signals caused by the differences in the distances between the seismic sensors and the source), statics correcting the seismic data signals, amplitude normalizing the seismic data signals, frequency filtering the seismic data signals and selecting only frequency bands where ground roll is present and the difference filter is stable, selecting and filtering only those portions of the seismic data traces where ground roll is actually present (i.e. the "ground roll cone"), for example by using the method disclosed in our PCT International Application Publication Number WO98/22825, incorporated herein by reference, and correcting the estimated time delay if the source and the sensors are not linearly aligned.

Similar enhancements to the method can be produced by incorporating factors in addition to ground roll differential moveout when creating the differential filter. A suite of amplitude scaling factors (to adjust for differences between the relative amplitudes of the seismic data signals) and a suite of stack weighting factors (to allow for the influence on the final filtered trace from each of the input traces to be adjusted from simply 50/50) could be selected, for instance, and then the energy of the signal estimate over various frequency-time-windows for each of these factors could be calculated and the signal estimate with the minimum energy could be passed to output.

Other enhancements to the method involve making the estimate of the ground roll differential move-out frequency-dependent. An appropriate dispersive ground roll velocity can be obtained by performing a velocity analysis using the following steps: determining an appropriate ground roll cone; selecting data within the ground roll cone; dividing the data into time windows and frequency bands: for each frequency band, examining a range of velocities, applying a linear move-out on the data using a particular velocity, testing all velocities in the range, selecting the particular velocity that yields the highest coherence between the traces (i.e. that results in the filtered signal with the lowest energy), and completing the examination for each of the frequency bands. The difference filtered frequency bands can be merged, inverse Fourier transformed, and then all of the time windows can be merged to create the output trace.

Multiple ground roll modes can be attenuated by creating difference filters for different dominant ground roll velocities (each having a different ground roll differential move-out/time delay term, $z^n$) and then applying the difference filters to the seismic data signals in a cascading multiple-pass manner to estimate and attenuate ground roll at each of the different dominant ground roll velocities.

Receiver pairs can also be selected in an automatic fashion using the receiver layout geometry and selecting, for each receiver, an ensemble of other receivers whose distance from this receiver is smaller than a defined threshold. From this ensemble of other receivers, particular receivers can be selected, for instance by selecting those receivers that come closest to an optimal moveout defined by the user.

If the number of available nearby seismic sensors (K) is greater than the number of dominant ground roll velocities to be removed (N) plus one, a least squares fit can be used to increase the robustness of the method.

One method for utilizing such a least squares fit is to solve the following equation:

$$\begin{bmatrix} S \\ G \end{bmatrix} = [A^{*T}A + \delta I]^{-1} A^{*T} R$$

In this equation, S again denotes the desired signal estimate, the vector G contains the N individual noise (ground roll) estimates, the vector R contains the K input seismic data signals, and I denotes the [(N+1)×(N+1)] identity matrix. A is a [K×(N+1)] matrix containing the delay times in the following form:

$$A = \begin{bmatrix} 1 & \ldots & 1 & \ldots & 1 \\ 1 & \ldots & z^{n_1} & \ldots & z^{n_v} \\ \ldots & \ldots & \ldots & \ldots & \ldots \\ 1 & \ldots & z^{(K-1)n_1} & \ldots & z^{(K-1)n_v} \end{bmatrix}$$

To avoid including the poles of the filter in the frequency range to which the difference filter is applied, the seismic sensors have an optimum spacing approximately equal to the lower of $(0.05*V_1)/f_0$ and $(0.95*V_0)/f_1$ where $V_1$ is a highest ground roll velocity to be attenuated, $f_0$ is a lowest ground roll frequency to be attenuated, $v_0$ is a lowest ground roll velocity to be attenuated, and $f_1$ is a highest ground roll frequency to be attenuated.

At various points in the processing sequence (such as for each time window or frequency band), the results of the difference filter can be compared to the comparable portions of alternative seismic traces, such as the input traces and/or the results of a conventional stack. If certain criteria are fulfilled (such as either of the alternatives having lower energy than the results of the difference filter), the difference filter results can be discarded and the better alternative used in its place in subsequent data processing.

The ground roll estimate can also be output using the method, and used for quality control purposes or in subsequent ground roll removal processes that utilize ground roll estimates as inputs.

It is estimated that the inventive method is capable of attenuating ground roll by 10–13 dB in the 10–50 Hz frequency range, while limiting signal distortion in this frequency range to on the order of 1–2 dB.

When using this method, it is possible to record less than all of the seismic data signals from the seismic sensors in an array and to subsequently reconstruct the unrecorded data signals using one or more recorded seismic data signals and the recorded ground roll attenuated seismic data signals.

The present invention includes any novel feature or novel combination of features disclosed herein, either explicitly or implicitly.

What is claimed is:

1. A method of attenuating ground roll in seismic data signals, said method comprising the steps of:
   obtaining seismic data signals from nearby seismic sensors,
   creating a difference filter that incorporates an estimate of ground roll differential move-out between said seismic sensors, and
   applying said difference filter to said seismic data signals to produce a ground roll attenuated seismic data signal.

2. A method according to claim 1 wherein said difference filter is of the form $$\begin{bmatrix} S \\ G \end{bmatrix} = \frac{1}{1 - \delta z^n} \begin{bmatrix} -z^n & 1 \\ 1 & -1 \end{bmatrix} \begin{bmatrix} R_1 \\ R_2 \end{bmatrix},$$

where S is the ground roll attenuated seismic data signal, G is the ground roll, $R_1$ and $R_2$ are the seismic data signals from nearby seismic sensors, $z^n$ is a time delay factor associated with said ground roll differential move-out, and $\delta$ is a stabilization factor.

3. A method according to claim 2 wherein said stabilization factor $\delta$ is approximately 0.95.

4. A method according to claim 1 wherein seismic data signals are obtained from K nearby seismic sensors, K being a whole number greater than or equal to 3, and wherein ground roll differential move-outs are estimated for N dominant ground roll velocities, N being a whole number less than or equal to K minus 1.

5. A method according to claim 4, wherein ground roll at said N dominant ground roll velocities is removed from said seismic data signals obtained from said K nearby seismic sensors in a one-pass filter operation and this one-pass filter operation produces said ground roll attenuated seismic data signal as output.

6. A method according to claim 4 wherein K is greater than N plus 1 and a least squares fit is used to produce said ground roll attenuated seismic data signal.

7. A method according to claim 1 wherein difference filters are created for N dominant ground roll velocities, N being greater than or equal to 2, and each said difference filter is applied to said seismic data signals in a cascading multiple-pass manner to estimate and remove ground roll at each of said N dominant ground roll velocities.

8. A method according to claim 1 wherein said seismic data signals have been normal move-out corrected prior to creating said difference filter.

9. A method according to claim 1 wherein said seismic data signals have been statics corrected prior to creating said difference filter.

10. A method according to claim 1 wherein said seismic data signals have been amplitude normalized prior to creating said difference filter.

11. A method according to claim 1 wherein said seismic data signals have been frequency filtered prior to creating said difference filter.

12. A method according to claim 1 wherein factors in addition to said estimate of ground roll differential move-out and a stabilization factor are utilized to create said difference filter.

13. A method according to claim 1 wherein less than all of said seismic data signals from nearby seismic sensors are recorded and recorded ground roll attenuated seismic data signals allow unrecorded seismic data signals from nearby seismic sensors to be reconstructed.

14. A method according to claim 1 wherein said nearby seismic sensors have an spacing approximately equal to the lower of $(0.05*v_1)/f_0$ and $(0.95*v_0)/f_1$, where $v_1$ is a highest ground roll velocity to be attenuated, $f_0$ is a lowest ground roll frequency to be attenuated, $v_0$ is a lowest ground roll velocity to be attenuated, and $f_1$ is a highest ground roll frequency to be attenuated.

15. A method according to claim 1 wherein said estimate of ground roll differential move-out is frequency-dependent and an appropriate dispersive ground roll velocity is obtained by performing a velocity analysis using the following steps: determining an appropriate ground roll cone; selecting data within said ground roll cone; dividing said seismic data signals into frequency bands; for each said frequency band, examining a range of velocities, applying a linear move-out on said seismic data signals using a particular velocity, testing all velocities in said range, selecting a particular velocity that yields a highest coherence between said seismic data signals, and completing said examination for each of said frequency bands.

16. A method according to claim 1 wherein said difference filter is a frequency domain filter.

17. A method according to claim 1 wherein said ground roll estimate is output and utilized for quality control purposes or in subsequent ground roll removal processes.

18. A method according to claim 1 wherein said nearby seismic sensors are automatically selected based on their separation distances.

19. A method according to claim 1 wherein said ground roll attenuated seismic data signal is compared to an alternative seismic data signal and said alternative seismic data signal is used instead of said ground roll attenuated seismic data signal in subsequent data processing if certain selection criteria are satisfied.

* * * * *